Patented Mar. 8, 1932

1,848,724

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

UTILIZATION OF MIXED ACIDS

No Drawing. Application filed July 1, 1929. Serial No. 375,328.

This invention relates to the utilization of mixed acids and more particularly to the esterification of acid mixtures such as those obtained by the catalytic oxidation, decarboxylation, etc. of organic compounds.

Many processes for producing organic acids, particularly catalytic processes such as oxidations, decarboxylations, and the like, result in the production of a mixture of different acids which are frequently difficult to separate or to utilize. Typical examples of such acid mixtures are those produced by the oxidation of naphthalene to phthalic anhydride, the mixture containing varying amounts of fumaric and maleic acids and in some cases benzoic acid; the catalytic oxidation of toluene and its homologues to the corresponding acids, giving mixtures containing besides the benzoic acids, maleic acid or anhydride and in some cases fumaric acid; the catalytic oxidation of cresol to produce a mixture containing salicylic acid, maleic acid, fumaric acid, and mesotartaric acid; the catalytic oxidation of benzene, phenol or furfural producing a mixture containing maleic acid, fumaric acid and in some cases mesotartaric acid; the catalytic oxidation of phenanthrene producing diphenic acid, phthalic anhydride, maleic acid, fumaric acid, etc.; the catalytic decarboxylation of polycarboxylic acids, for example phthalic acids, succinic acid, adipic acid, diphenic acid, etc., the main products being the corresponding benzoic acids, propionic acids, valeric acids, and orthophenylbenzoic acids respectively mixed with some of the unchanged polycarboxylic acid. To the above list of typical illustrations of acid mixtures to which the present invention is applicable should be added the decarboxylation of substituted polycarboxylic acids, such as 3 and 4-nitro or 3 and 4-halogen phthalic acids, giving mainly mixtures of 3 and 4-nitro or halogen benzoic acids with some of the unchanged phthalic acid.

These mixtures of acids are difficult to separate by ordinary means, for example sublimation, distillation, and the like. According to the present invention the acids are separated or utilized by esterifying the mixture with one or more alcohols, producing mixed esters which for the most part boil at sufficiently different temperatures to permit a ready separation and in many cases the mixed esters can be utilized as such, for example as plasticizers for various plastics, such as cellulose ester or ether plastics; various resins capable of hardening by heat, such as phenol aldehyde resins, polybasic acid-polyhydric alcohol resins, amino plastics, sulfur resins, and the like.

In most cases the esters of the different acids boil sufficiently far apart so that they may be readily separated, but in the case of the mixtures by decarboxylating substituted phthalic acids the esters of any given alcohol boil at too nearly the same temperature to be readily separated. In such cases a modification of the present invention may be employed, utilizing the reluctance with which 3-substituted phthalic acids esterify beyond the monoester stage. The esterification is carried to the point where the monoester of the phthalic acid and the esters of the corresponding benzoic acids are obtained. The monoester is then separated by an alkaline wash and the benzoic esters are distilled off. The monoester of the phthalic acid may be separated from the alkaline wash if it is present in sufficient quantities to warrant its separation, but in many cases the amount present is not sufficiently large to make it economically practical to recover it. This modification of the process of the present invention might be considered as a method for removing an impurity from the benzoic acid. Naturally, of course, where the mixed esters are to be used as such it is not necessary in all cases to separate out the 3-substituted phthalic esters, although for many purposes a monoester is not a satisfactory constituent of the ester mixture because of its acidic character. In such cases, even though the product is to be used as an ester, it may be desirable to remove the mono-phthalic esters as described above.

It will be apparent that the present invention permits a utilization of mixed acids without separating their constituents, and in many cases the esterified product is used without even separating the esters. A very economical process is thus possible, since much of the expensive purification hitherto required is completely eliminated and the materials used in the case of the more common esters are relatively cheap. Once the esters have been separated, of course, they can be readily saponified if the free acid is desired and in some cases, for example mixtures of phthalic acid and benzoic acid, it may be desirable to obtain the benzoic acid finally in the form of an acid or salt, whereas the phthalic acid is desired as an ester. In such a case, after esterification and separation of the esters, only the benzoic acid ester would be saponified. The present invention, of course, includes all such modifications and one of its advantages lies in its extreme flexibility, making it readily applicable to the needs of the producer of mixed acids.

The method of esterification does not per se form any part of the present invention. Any of the suitable known means of esterification may be employed. It is convenient, however, in some cases to employ the azeotropic method as this method, where applicable, has many advantages from an operating standpoint. In the case of some of the mixed acids it is desirable to employ a combined method, using both azeotropy with the more ordinary methods using dehydrating agents, such as sulfuric acid and the like. This method is not claimed here broadly as applied to esterifications generally, but only in connection with the esterification of mixed acids, which forms the subject matter of the present invention.

The invention will be described in greater detail in connection with the following specific examples, which illustrate typical modifications of the invention, it being understood that these are illustrations only and that the invention is in no sense limited to the specific details therein set forth.

Example 1

A mixture of phthalic anhydride, maleic anhydride or maleic acid, and fumaric acid, such as obtained by the catalytic oxidation of naphthalene, is esterified by refluxing the mixture with 10 to 15 volumes of commercial methanol of 95% or higher concentration, using 1 to 4% of concentrated sulfuric acid as an esterifying agent. When the esterification equilibrium is complete, 5 to 9 parts of the alcohol are distilled off, the reaction mixture is run into water and subjected to the usual washing and drying. The dried mixed esters are then fractionated by means of a still containing a column to reflux 40-60% of the distillate. The fractions from 185-190° C., 192 to 200° C., and 200 to 210° C. are recovered separately, being respectively dimethyl fumarate, mixed dimethyl maleate and fumarate, and dimethyl maleate. If a more complete separation is desired, the first and third fractions may be refractionated and the second fraction may be added to succeeding batches. The temperature of the still column is then adjusted to reflux only about 10-15%. The phthalic anhydride and dimethyl phthalate are then distilled off under reduced pressure. At 5-10 mm. pressure the anhydride mixed with some ester distills off at 132-149° C. and is utilized by returning it to the succeeding esterification batch. All distillate coming over above 160° C. is collected as dimethyl phthalate. Any small amounts of phthalic anhydride which contaminate this ester fraction may be readily removed by agitation with hot, very dilute alkali metal carbonate solution.

Example 2

A mixture of phthalic and benzoic acids resulting from partial decarboxylation of phthalic acid is esterified by refluxing with 2 volumes of ethyl alcohol and 8-10 volumes of toluene or xylene. 1/100 part of concentrated hydrochloric acid being used as a catalyst. The reflux should continue for from 2-3 hours. After esterification is complete, the mixture is distilled with a good fractionating column first adjusted to reflux all but the low-boiling azeotropic hydrocarbon-alcohol-water mixture. This is continued with renewed quantities of hydrocarbon and alcohol, if necessary, until the acidity of the still contents no longer decreases. The distillation temperature is then permitted to rise to remove all of the hydrocarbon. After removal of the hydrocarbon the temperature is still further raised and the ethyl benzoate is distilled off up to 215° C. The residual phthalic anhydride and diethyl phthalates are separated and recovered as described in connection with the methyl ester in Example 1.

Example 3

A mixture of phthalic and benzoic acids containing only small amounts of phthalic acid, which may result from a very efficient decarboxylation of phthalic acid, is esterified without the use of mineral acid or with only a small fraction of the usual amount. In such cases the phthalic acid apparently serves as catalyst for esterification of the benzoic acid, which latter is recovered almost completely as the ester. The phthalic acid is esterified little, if at all, and may be returned to the decarboxylation process.

The esterification may be carried out, for example, as described in Example 1, but using only 1/1000 part of mineral acid. In this case the phthalic acid is recovered from the alkaline wash if it is present in sufficient amount to warrant this recovery.

The esterification may also be carried out by the azeotropic method as described in Example 2, the mineral acid being omitted. In this case the phthalic acid is recovered almost wholly as the anhydride by vacuum distillation.

Either of these procedures may be applied to mixtures containing larger proportions of phthalic acid wherever it is economical to rerun the whole of the phthalic acid in the decarboxylation process rather than to recover part of it as the phthalic ester as is possible when the mineral acid is used as described in Example 2.

The procedures of these examples could also be used for the separation of phthalic acid from maleic acid or from maleic and fumaric acids. The procedure is, of course, also applicable to the separation of substituted benzoic acids from substituted phthalic acids.

*Example 4*

100 parts of a mixture of adipic and valeric acids such as may be obtained from the partial decarboxylation of adipic acid are heated in a steam-jacketed vessel with 1,000 to 1,200 parts of amyl alcohol and 2–3 parts of benzene sulfonic acid or other aromatic sulfonic acid, the heating continuing as long as the total acidity of the mixture decreases. The product is then poured into water, washed in the usual manner with water or a dilute alkaline solution and then fractionated, distilling off amylene, amyl alcohol, and diamylene at a temperature of about 160° C. at the top of the column. The still contents is then cooled and amyl valerate is then distilled off under reduced pressure, for example cutting at 105° at the top of the column under 12–16 mm. The remainder, which is diamyl adipate, is then distilled off at as low a pressure as can be obtained in the apparatus.

The examples describe modifications of the process as applied to typical mixtures of acids, and of course are equally applicable to other mixtures, such as those described in the introductory portion of the specification.

What is claimed as new is:

1. A process for the utilization of mixed acids obtained by vapor phase catalysis of organic substances, at least one of the acids being phthalic acid, which comprises subjecting the mixture to an esterification with at least one alcohol.

2. A method according to claim 1 in which the mixture is obtained by the decarboxylation of a phthalic acid and contains as one of the acids present a benzoic acid.

3. A method of utilizing acid mixture containing both poly and monocarboxylic acids which comprises subjecting the acid mixture to esterification with at least one non-resin forming alcohol.

4. A method of utilizing acid mixtures from the vapor phase catalysis oxidation of organic compounds containing at least one difficulty esterifiable polycarboxylic acid which comprises subjecting the mixture to esterification with at least one alcohol in an amount insufficient to carry the esterification of the difficultly esterfiable polycarboxylic acid beyond the monoester state and subjecting the mixture obtained to a washing treatment with a wash solution capable of dissolving the monoester of the difficultly esterfiable polycarboxylic acid.

5. A method according to claim 4, in which the difficultly esterfiable acid is a phthalic acid.

6. A method according to claim 4, in which the difficultly esterfiable acid is a substituted phthalic acid.

7. A method of separating mixed acids from the catalytic treatment of organic substances comprising an esterifying mixture and subjecting it to fractional distillation in order to separate the esters formed.

8. As new products a mixture of esters of phthalic and benzoic acids obtained by esterifying a mixture of phthalic and benzoic acids from the decarboxylation of phthalic acid.

9. A method of utilizing mixed acids obtained by the partial decarboxylation of polycarboxylic acids to monocarboxylic acids, which comprises subjecting the mixture of acids to esterification with at least one alcohol.

10. As new products mixed esters obtained by esterifying a mixture of acids prepared by subjecting polycarboxylic acids to partial decarboxylation to monocarboxylic acids.

Signed at Pittsburgh, Pennsylvania, this 29th day of June, 1929.

ALPHONS O. JAEGER.